(12) United States Patent
Kim et al.

(10) Patent No.: US 12,488,943 B2
(45) Date of Patent: Dec. 2, 2025

(54) MULTILAYER ELECTRONIC COMPONENT HAVING MOISTURE-AND HYDROGEN-RESISTANT INTERFACIAL STRUCTURE

(71) Applicant: SAMSUNG ELECTRO-MECHANICS CO., LTD., Suwon-si (KR)

(72) Inventors: Da Mi Kim, Suwon-si (KR); Bum Suk Kang, Suwon-si (KR); Su Jin Lee, Suwon-si (KR); Dae Woo Yoon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 143 days.

(21) Appl. No.: 18/127,808

(22) Filed: Mar. 29, 2023

(65) Prior Publication Data
US 2024/0222028 A1    Jul. 4, 2024

(30) Foreign Application Priority Data
Dec. 29, 2022   (KR) .................. 10-2022-0188463

(51) Int. Cl.
*H01G 4/30*        (2006.01)
*H01G 4/008*       (2006.01)
(Continued)

(52) U.S. Cl.
CPC .............. *H01G 4/30* (2013.01); *H01G 4/008* (2013.01); *H01G 4/012* (2013.01); *H01G 4/12* (2013.01); *H01G 4/2325* (2013.01)

(58) Field of Classification Search
CPC .......... H01G 4/30; H01G 4/008; H01G 4/012; H01G 4/12; H01G 4/2325; H01G 4/232; H01G 4/33; H01G 4/1227
See application file for complete search history.

(56) References Cited

U.S. PATENT DOCUMENTS

2002/0075632 A1*  6/2002  Nakano .................... H01G 4/12
                                                                361/320
2011/0149471 A1*  6/2011  Hur ........................ H01G 4/008
                                                                361/321.2
(Continued)

FOREIGN PATENT DOCUMENTS

JP      2006-202649 A    8/2006
WO      2005-055257 A1   6/2005

*Primary Examiner* — Timothy J. Dole
*Assistant Examiner* — Daniel M Dubuisson
(74) *Attorney, Agent, or Firm* — MORGAN, LEWIS & BOCKIUS LLP

(57) ABSTRACT

A multilayer electronic component is provided, the multilayer electronic component, including: a body including a dielectric layer and internal electrodes alternately disposed with the dielectric layer interposed therebetween in a first direction, the body having first and second surfaces opposing each other in the first direction, third and fourth surfaces connected to the first and second surfaces and opposing each other in a second direction, fifth and sixth surfaces connected to the first to fourth surfaces and opposing each other in a third direction; and an external electrode disposed on the third and fourth surfaces of the body and connected to the internal electrodes. At least one of the internal electrodes includes an interfacial layer disposed on at least a portion of a region connected to the external electrode, and the interfacial layer includes an oxide containing Fe.

14 Claims, 4 Drawing Sheets

(51) Int. Cl.
*H01G 4/012* (2006.01)
*H01G 4/12* (2006.01)
*H01G 4/232* (2006.01)

(56) References Cited

U.S. PATENT DOCUMENTS

| | | | | |
|---|---|---|---|---|
| 2020/0303123 | A1* | 9/2020 | Lee | H01G 4/2325 |
| 2020/0411248 | A1* | 12/2020 | Hashimoto | H01G 4/1227 |
| 2021/0202177 | A1* | 7/2021 | Kurosu | H01G 4/1218 |
| 2022/0044873 | A1* | 2/2022 | Kuroda | H01G 4/248 |
| 2022/0293344 | A1* | 9/2022 | Iguchi | H01G 4/1227 |
| 2023/0290576 | A1* | 9/2023 | Mizuno | H01G 4/30 |
| 2023/0298820 | A1* | 9/2023 | Masuda | H01G 4/012 |
| | | | | 361/301.4 |
| 2023/0317373 | A1* | 10/2023 | Suemasa | H01G 4/0085 |
| | | | | 361/301.4 |
| 2024/0112861 | A1* | 4/2024 | Mizuno | H01G 4/1209 |

* cited by examiner

MULTILAYER ELECTRONIC COMPONENT HAVING MOISTURE-AND HYDROGEN-RESISTANT INTERFACIAL STRUCTURE

CROSS-REFERENCE TO RELATED APPLICATION (S)

This application claims benefit of priority to Korean Patent Application No. 10-2022-0188463 filed on Dec. 29, 2022 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, may be a chip-type condenser mounted on the printed circuit boards of any of various electronic products, such as an imaging device, including a liquid crystal display (LCD) or a plasma display panel (PDP), a computer, a smartphone, or a mobile phone, serving to charge or discharge electricity therein or therefrom.

The multilayer ceramic capacitor has a small size, implements high capacitance, and is easily mounted on a circuit board, and may thus be used as a component of various electronic devices. There has been increasing demand for a multilayer ceramic capacitor to have a reduced size and higher capacitance as each of various electronic devices such as a computer and a mobile device have a reduced size and higher output. In addition, as the application thereof to electronic parts for automobiles has increased, high reliability in various environments is required.

An external electrode of the multilayer ceramic capacitor may generally include a conductive metal for electrical connection with the internal electrodes and glass for securing bonding force with the body. In addition, in general, a Ni plating layer for mounting and a Sn plating layer disposed on the Ni plating layer are disposed on a surface of the external electrode.

However, hydrogen ions are generated by a chemical reaction in a process of forming the Ni plating layer and the Sn plating layer, and these hydrogen ions permeate into the internal electrodes and the dielectric layer, so that there was a problem in that insulation resistance is deteriorated or short defects occur.

In addition, since the glass included in the external electrode has low corrosion resistance to a plating solution, the glass may be eroded by the plating solution, and external moisture permeates into the body through a moisture resistance path caused by the erosion of the glass, so that there was a problem in that reliability of the multilayer ceramic capacitor lowered.

SUMMARY

An aspect of the present disclosure is to improve reliability of a multilayer electronic component by preventing hydrogen and external moisture from permeating into a body.

However, the object of the present invention is not limited to the above, and will be more easily understood in the process of describing specific embodiments of the present disclosure.

According to an aspect of the present disclosure, provided is a multilayer electronic component, the multilayer electronic component including: a body including a dielectric layer and internal electrodes alternately disposed with the dielectric layer interposed therebetween in a first direction, the body having first and second surfaces opposing each other in the first direction, third and fourth connected to the first and second surfaces and opposing each other in a second direction, fifth and sixth surfaces connected to the first to fourth surfaces and opposing each other in a third direction; and an external electrode disposed on the third and fourth surfaces of the body and connected to the internal electrodes. At least one of the internal electrodes includes an interfacial layer disposed on at least a portion of a region connected to the external electrode, and the interfacial layer includes an oxide containing Fe.

According to an aspect of the present disclosure, provided is a multilayer electronic component, the multilayer electronic component including: a body including a dielectric layer and internal electrodes alternately disposed with the dielectric layer interposed therebetween in a first direction, the body having first and second surfaces opposing each other in the first direction, third and fourth surfaces connected to the first and second surfaces and opposing each other in a second direction, fifth and sixth surfaces connected to the first to fourth surfaces and opposing each other in a third direction; and an external electrode disposed on one of the third and fourth surfaces of the body to connect to two or more of the internal electrodes. Interfacial layers of the two or more of the internal electrodes, connected to the external electrode, include Fe having a density higher than Fe included in a region between the interfacial layers.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
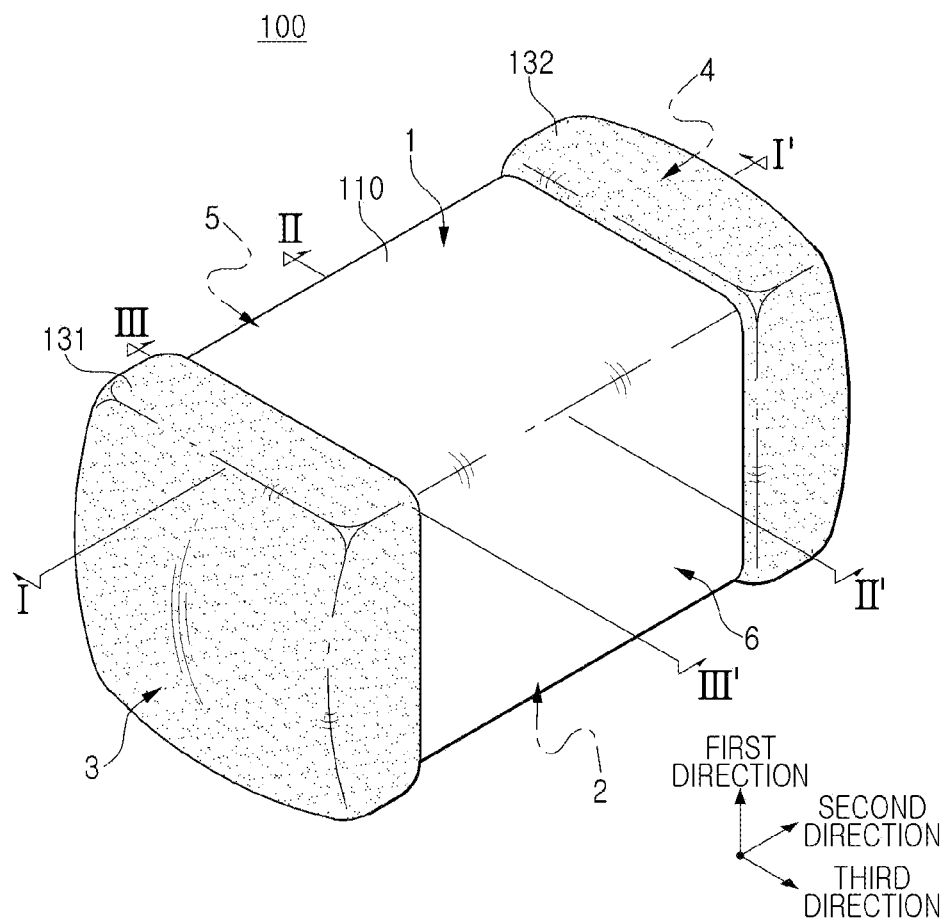
FIG. 1 is a perspective view schematically illustrating a multilayer electronic component according to an embodiment of the present disclosure.

Hereinafter, embodiments of the present disclosure will be described as follows with reference to the attached drawings. The present may, however, disclosure be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are the same elements in the drawings.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may further include other components as well, rather than excluding other components, unless specifically stated otherwise.

In the drawings, a first direction may refer to a thickness (T) direction, a second direction may refer to a length (L) direction, and a third direction may refer to a width (W) direction.

Multilayer Electronic Component

FIG. 1 is a perspective view schematically illustrating a multilayer electronic component according to an embodiment of the present disclosure.

Figure 2:
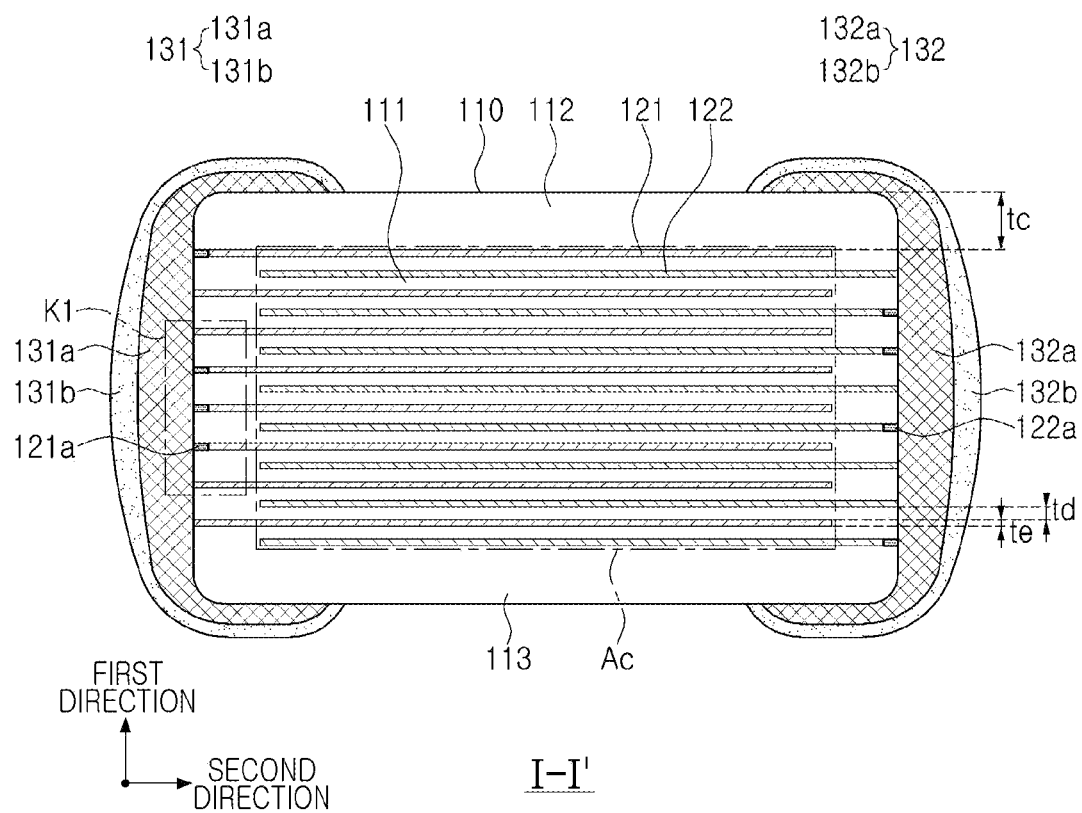
FIG. 2 is a cross-sectional view schematically illustrating a cross-section taken along line I-I' of FIG. 1.

FIG. 2 is a cross-sectional view schematically illustrating a cross-section taken along line I-I' of FIG. 1.

Figure 3:
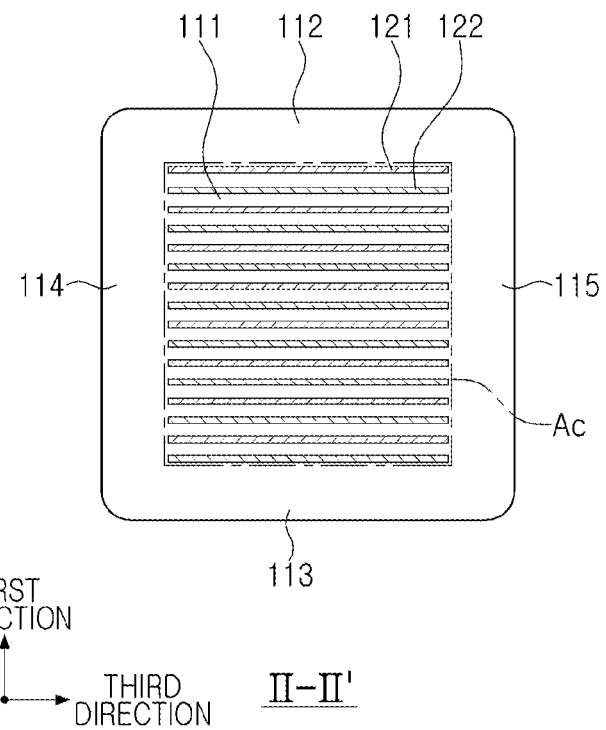
FIG. 3 is a cross-sectional view schematically illustrating a cross-section taken along line II-II' of FIG. 1.

FIG. 3 is a cross-sectional view schematically illustrating a cross-section taken along line II-II' of FIG. 1.

Figure 4:
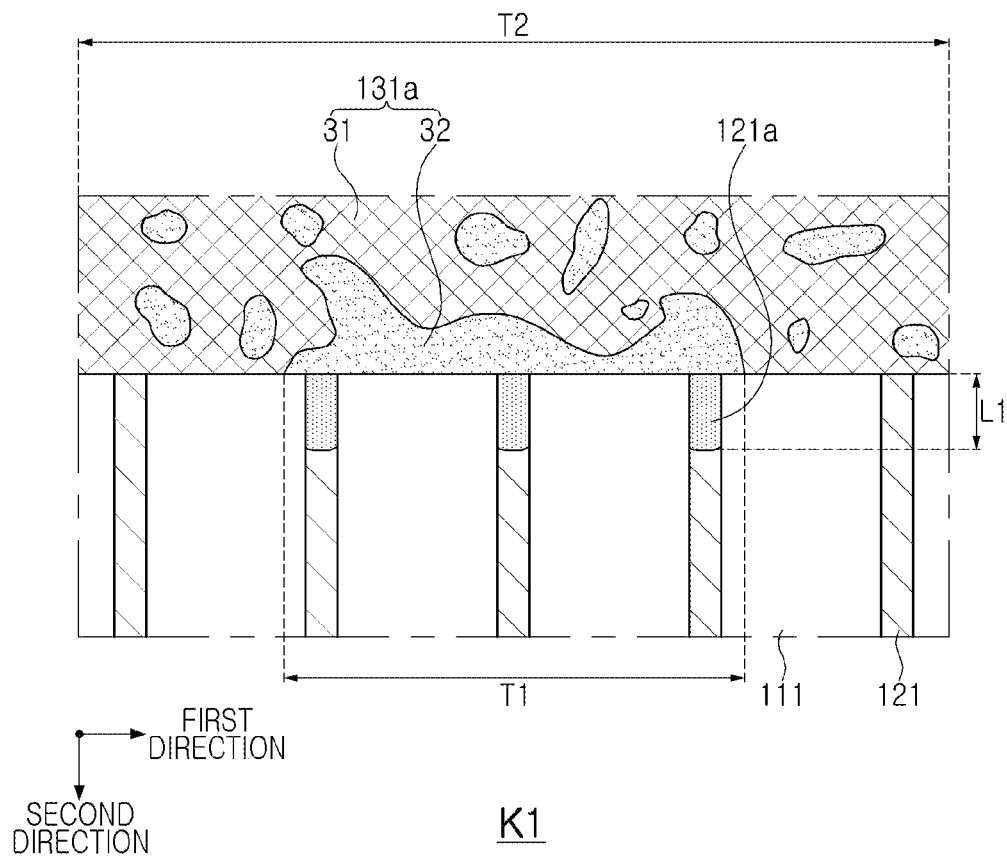
FIG. 4 is an enlarged view of a region K1 of FIG. 1.

FIG. 4 is an enlarged view of a region K1 of FIG. 1.

Figure 5:
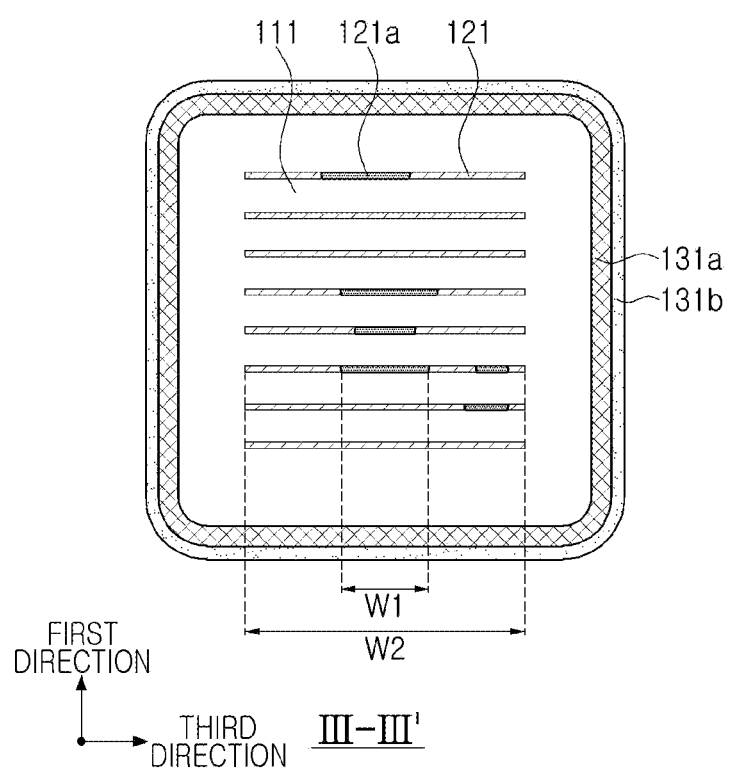
FIG. 5 is a cross-sectional view schematically illustrating a cross-section taken along line III-III' of FIG. 1.

FIG. 5 is a cross-sectional view schematically illustrating a cross-section taken along line III-III' of FIG. 1.

Hereinafter, a multilayer electronic component 100 according to an embodiment in the present disclosure will be described with reference to FIGS. 1 to 6. In addition, a multi-layered ceramic capacitor (hereinafter referred to as 'MLCC') will be described as an example of a multilayer electronic component, but the present disclosure is not limited thereto, and it may also be applied to various multilayer electronic components such as an inductor and piezoelectric elements, varistors, thermistors, or the like.

Referring to FIGS. 1 to 5, a multilayer electronic component 100 according to an embodiment of the present disclosure may include: a body 110 including a dielectric layer 111 and internal electrodes 121 and 122 alternately disposed with the dielectric layer interposed therebetween in a first direction, the body 110 including first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces 1 to 4 and opposing each other in a third direction; and external electrodes 131 and 132 disposed on the third and fourth surfaces 3 and 4 of the body 110 and connected to the internal electrodes. At least one of the internal electrodes may include interfacial layers disposed on at least a portion of a region connected to the external electrode, and the interfacial layer may include an oxide containing Fe.

According to an embodiment of the present disclosure, at least one of the internal electrodes 121 and 122 may include interfacial layers 121a and 122a disposed on at least a portion of a region thereof connected to the external electrodes 131 and 132, and the interfacial layer may include an oxide containing Fe to prevent hydrogen ions from permeating into the body 110 due to a chemical reaction occurring in a process of forming a plating layer, thereby suppressing deterioration of insulation resistance and occurrence of short defects, and reliability of the multilayer electronic component 100 may be improved by preventing external moisture from permeating into the body 110 through a moisture resistance path caused by erosion of the glass included in the external electrodes 131 and 132.

Hereinafter, each component included in the multilayer electronic component 100 according to an embodiment of the present disclosure will be described.

The body 110 is not limited to a particular shape, and may have a hexahedral shape or a shape similar to the hexahedral shape, as illustrated in the drawings. The body 110 may not have the shape of a hexahedron having perfectly straight lines because ceramic powder particles included in the body 110 are contracted in a process in which the body is sintered. However, the body 110 may have a substantially hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first and second surfaces 1 and 2, connected to the third and fourth surfaces 3 and 4, and opposing each other in a third direction.

A plurality of dielectric layers 111 forming the body 110 may be in a sintered state, and adjacent dielectric layers 111 may be integrated with each other, such that boundaries therebetween may not be readily apparent without using a scanning electron microscope (SEM).

The dielectric layer 111 may be formed by preparing a ceramic slurry containing ceramic powder, an organic solvent and a binder, coating and drying the slurry on a carrier film to prepare a ceramic green sheet, and then sintering the ceramic green sheet. The ceramic powder is not particularly limited as long as sufficient capacitance may be obtained therewith, but, for example, barium titanate-based materials, lead composite perovskite-based materials, or strontium titanate-based materials may be used. The barium titanate-based material may include a $BaTiO_3$-based ceramic powder, and examples of the ceramic powder may include $BaTiO_3$, or $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$, in which calcium (Ca), zirconium (Zr), or the like is partially dissolved into $BaTiO_3$, and the like.

An average thickness "td" of the dielectric layer 111 is not particularly limited, but, for example, an average thickness of at least one of the dielectric layers 111 may be 10 μm or less. However, as the thickness of the dielectric layer 111 becomes thinner, deterioration of insulation resistance due to hydrogen permeating into the body 110 and external moisture easily occurs, thereby causing a problem in that reliability of the multilayer electronic component is deteriorated. On the other hand, in the case of the multilayer electronic component according to an embodiment of the present disclosure, even when the average thickness "td" of at least one of the dielectric layers 111 is 0.4 μm by including the interfacial layers 121a and 122a containing an oxide containing Fe, the reliability of the multilayer electronic component may be secured.

Here, the average thickness "td" of the dielectric layer 111 may refer to a size of the dielectric layer 111 disposed between the internal electrodes 121 and 122 in a first direction. The average thickness of the dielectric layer 111 may be measured by scanning a cross-section of the body 110 in first and second directions with a scanning electron microscope (SEM) at a magnification of 10,000. More specifically, an average value may be measured by measuring a thickness of one dielectric layer 111 at a plurality of points, for example, at 30 points equally spaced in a second direction. The 30 points having equal intervals may be designated in the capacitance formation portion Ac. In addition, if the average value is measured by extending the average value measurement to 10 dielectric layers, the average thickness of the dielectric layers can be more generalized.

The body 110 may include a capacitance formation portion Ac disposed in the body 110, and including first and second internal electrodes 121 and 122 alternately disposed with the dielectric layer 111 interposed therebetween and having capacitance formed therein, and a first cover portion 112 and a second cover portion 113 respectively disposed on both side surfaces of the capacitance formation portion Ac opposing each other in the first direction. The cover portions 112 and 113 may basically serve to prevent damage to the internal electrode due to physical or chemical stress. The cover portions 112 and 113 may have substantially the same structure as the dielectric layer 111, except for not including internal electrodes.

A thickness of the cover portions 112 and 113 does not need to particularly limited. However, an average thickness "tc" of the cover portions 112 and 113 may be 20 μm or less in order to reduce the size and increase the capacitance of the multilayer electronic component. As described above, even when the average thickness "tc" of the cover portions 112 and 113 is 20 μm or less, reliability of the multilayer electronic component may be secured by including interfacial layers 121a and 122a including an oxide containing Fe. Here, the average thickness of the cover portions 112 and 113 refer to an average thickness of each of the first cover portion 112 and the second cover portion 113.

The average thickness of the cover portions 112 and 113 may refer to an average size of the cover portions 112 and 113 in a first direction, and may be a value obtained by averaging sizes of the cover portions 112 and 113 measured at five points having equal intervals in a cross-section of the body 110 in first and second directions.

The body 110 may include a first margin portion 114 and a second margin portion 115 respectively disposed on both side surfaces of the capacitance formation portion Ac opposing each other in a third direction. That is, the margin portions 114 and 115 may refer to regions between both ends of the internal electrodes 121 and 122 and a boundary of the body 110 in the cross-section of the body 110 cut in the body in the first and third directions.

The margin portions 114 and 115 may include substantially the same material as the dielectric layer 111, except for not including the internal electrodes 121 and 122. The margin portions 114 and 115 may basically serve to prevent damage to the internal electrodes 121 and 122 due to physical or chemical stress.

The margin portions 114 and 115 may be formed by applying a conductive paste to the ceramic green sheet, except where margin portions are to be formed. Alternatively, in order to suppress a step by the internal electrodes 121 and 122, after the internal electrodes are cut so as to be exposed to the fifth and sixth surfaces 5 and 6 of the body after lamination, the margin portions 114 and 115 may also be formed by laminating a single dielectric layer or two or more dielectric layers on both side surfaces of the capacitance formation portion Ac in the third direction.

An average thickness of the margin portions 114 and 115 is not particularly limited. However, the average thickness of the margin portions 114 and 115 may be 20 μm or less in order to more easily achieve miniaturization and high capacitance of the multilayer electronic component. As described above, even when the average thickness of the margin portions 114 and 115 is 20 μm or less, the reliability of the multilayer electronic component may be secured by including interfacial layers 121a and 122a containing an oxide containing Fe. Here, the average thickness of the margin portions 114 and 115 refers to an average thickness of each of the first margin portion 114 and the second margin portion 115.

The average width of the margin portions 114 and 115 may refer to an average size of the margin portions 114 and 115 in a third direction, and may be a value obtained by averaging the margin portions 114 and 115 measured at five points having equal intervals in the third direction in the cross-section of the body 110 in the first and third directions.

The internal electrodes 121 and 122 may be alternately disposed, and for example, the internal electrodes 121 and 122 may include a first internal electrode 121 and a second internal electrode 122, alternately disposed with the dielectric layer 111 interposed therebetween. The first internal electrode 121 and the second internal electrode 122 may be electrically isolated from each other by the dielectric layer 111 disposed in a middle.

The first internal electrode 121 may be spaced apart from the fourth surface 4 and connected to the third surface 3. In addition, the second internal electrode 122 may be disposed to be spaced apart from the third surface 3 and connected to the fourth surface 4.

The conductive metal included in the internal electrodes 121 and 122 may be at least one of nickel (Ni), copper (Cu), palladium (Pd), silver (Ag), gold (Au), platinum (Pt), tin (Sn), tungsten (W), titanium (Ti), and alloys thereof, and more preferably, the internal electrodes 121 and 122 may include Ni as a main component. Here, the main component refers to a component having the highest atomic percentage (at %).

The internal electrodes 121 and 122 may be formed by applying a conductive paste for internal electrodes containing conductive metal to a predetermined thickness on a ceramic green sheet and sintering the same. A method of printing the conductive paste for the internal electrodes may be a screen printing method, a gravure printing method, or the like, but the present disclosure is not limited thereto.

An average thickness "te" of the internal electrodes 121 and 122 is not particularly limited, but for example, the average thickness "te" of at least one of the internal electrodes 121 and 122 may be 3 μm or less. Meanwhile, as described above, in the case of the multilayer electronic component according to an embodiment of the present disclosure, even when the average thickness "te" of the internal electrodes 121 and 122 is 0.4 μm or less by including interfacial layers 121a and 122a including an oxide containing Fe, the reliability of the multilayer electronic component may be secured.

The average thickness "te" of the internal electrodes 121 and 122 refers to a size of the internal electrodes 121 and 122 in a first direction. Here, the average thickness of the internal electrodes 121 and 122 may be measured by scanning a cross-section of the body 110 in first and second directions with a scanning electron microscope (SEM) at a magnification of 10,000. More specifically, an average value may be measured by measuring a thickness of one of the internal electrodes 121 and 122 at a plurality of points thereof, for example, at 30 equally spaced points in the second direction. In addition, if the average value is measured by extending the average value measurement to 10 internal electrodes 121 and 122, the average thickness of the internal electrodes can be more generalized.

The external electrodes 131 and 132 may be disposed on the third surface 3 and the fourth surface 4 of the body 110, and may extend onto portions of the first surface 1, the second surface 2, the fifth surface 5, and the sixth surface 6. In addition, the external electrodes 131 and 132 may include a first external electrode 131 disposed on the third surface 3 and connected to the first internal electrode 121 and a second external electrode 132 disposed on the fourth surface 4 second internal electrode 122.

The external electrodes 131 and 132 may be disposed to be in contact with the internal electrodes 121 and 122, and include a base electrode layers 131a and 132 including a conductive metal and glass. For example, the first external electrode 131 may be disposed to be in contact with the first internal electrode 121, and include a first base electrode layer 131a including a conductive metal and glass, and the second external electrode 132 may be disposed to be in contact with the second internal electrode 122, and include a second base electrode layer 132a including a conductive metal and glass.

The glass included in the base electrode layers 131a and 132a may basically serve to improve bonding force between the body 110 and the external electrodes 131 and 132. The glass is not particularly limited, but may include an oxide containing at least one of Fe, Si, Al, Sn, Zn, Li, Na, Ba, Ca, Sr, Mn, Ag, Ge, In, Co, Ti, P, B, Cu and K, more preferably an oxide containing Fe.

The oxide containing Fe included in the glass may include, for example, at least one of $FeO$, $Fe_2O_3$ and $Fe_3O_4$, but the present disclosure is not limited thereto. The oxide containing Fe may react with Ni included in the internal electrodes 121 and 122 to serve to form interfacial layers 121a and 122a. In addition, $SiO_2$, $Al_2O_3$ and $B_2O_3$ included in the glass may serve to adjust the bonding force of the glass, and $Li_2O$, $Na_2O$, $K_2O$, BaO, CaO and SrO included in the glass may serve to control a melting point and flow of the glass, and ZnO included in the glass may perform the function of crystallization suppression. Meanwhile, $SnO_x$, $MnO_x$, $Ag_2O$, and $In_2O_3$ included in the glass may serve to improve wettability between the conductive metal and the glass, and CoO and $GeO_2$ included in the glass may serve to strengthen the bonding force through an increase of oxygen cross-linking in the glass, and $TiO_2$ and $P_2O_5$ included in the glass may serve to strengthen reactivity with the conductive metal and chemical resistance of the glass.

The base electrode layers 131a and 132a may be formed by dipping the third and fourth surfaces 3 and 4 of the body 110 in a conductive paste for external electrodes including conductive metal and glass, and then sintering the same. Alternatively, the base electrode layers 131a and 132a may be formed by transferring a sheet including conductive metal and glass. The conductive metal included in the base electrode layers 131a and 132a may include copper (Cu), nickel (Ni), palladium (Pd), platinum (Pt), gold (Au), silver (Ag), lead (Pb), and/or alloys thereof, and more preferably, the conductive metal included in the base electrode layers 131a and 132a may include Cu.

When the conductive metal included in the base electrode layers 131a and 132a includes Cu, wettability with Sn, Mn, Ag, and In oxides included in the glass may be improved to improve density of the base electrode layers 131a and 132a. In addition, a Ni—Cu alloy layer may be formed at an interface between the internal electrode and the base electrode layer by mutual diffusion of Cu included in the base electrode layers 131a and 132a and Ni included in the internal electrodes 121 and 122, so that permeation of hydrogen and external moisture into the body may be suppressed.

The external electrodes 131 and 132 may include terminal electrode layers 131b and 132b disposed on the base electrode layers 131a and 132a. That is, the first external electrode 131 may include a first terminal electrode layer 131b disposed on the first base electrode layer, and the second external electrode 132 may include a second terminal electrode layer 132b disposed on the second base electrode layer. The terminal electrode layers 131b and 132b may improve mounting characteristics. A type of the terminal electrode layers 131b and 132b is not particularly limited, and may be a plating layer including nickel (Ni), tin (Sn), palladium (Pd), and/or an alloy including the same, and may be formed of a plurality of layers. The terminal electrode layers 131b and 132b may be, for example, a nickel (Ni) plating layer or a tin (Sn) plating layer, or may have a form in which a nickel (Ni) plating layer and a tin (Sn) plating layer are sequentially formed. In addition, the terminal electrode layers 131b and 132b may include a plurality of nickel (Ni) plating layer and/or a plurality of tin (Sn) plating layers.

In the drawings, a structure in which the multilayer electronic component 100 has two external electrodes 131 and 132 is described, but an embodiment thereof is not limited thereto. However, the number and shape of the external electrodes 131 and 132 may be changed according to the shape of the internal electrodes 121 and 122 or other purposes.

As illustrated in FIG. 2, according to an embodiment of the present disclosure, at least one of the internal electrodes 121 and 122 may include interfacial layers 121a and 122a disposed on at least a portion of a region of the internal electrodes 121 and 122 connected to the external electrodes 131 and 132, the interfacial layer including an interfacial layer containing Fe. For example, the first internal electrode 121 may include a first interfacial layer 121a disposed on at least a portion of a region thereof connected to the first external electrode 131, and the second internal electrode 122 may include a second interfacial layer 122a disposed on at least a portion of a region thereof connected to the second external electrode 132.

In general, it is known that a hydrogen diffusion coefficient of Fe metal at room temperature is about $3.60\times10^{-9}$ $m^2/s$, and a hydrogen diffusion coefficient of Ni metal at room temperature is about $1.89\times10^{-13}$ $m^2/s$. That is, the hydrogen diffusion coefficient of Fe metal, which is 4 orders higher than that of Ni metal.

Meanwhile, when Fe is oxidized and exists in a form of $FeO_x$, the hydrogen diffusion coefficient at room temperature is about $6.00\times10^{-23}$ $m^2/s$, which is 10 orders lower than that of Ni metal. In addition, sodium aluminosilicate ($16Na_2O$-$10Al_2O_3$-$74SiO_2$), a type of glass, has a hydrogen diffusion coefficient of about $4.05\times10^{-21}$ $m^2/s$ at room temperature, such that a hydrogen diffusion coefficient of $FeO_x$ is 2 orders lower than that of glass.

Accordingly, the present inventors had confirmed that the reliability of the multilayer electronic component may be improved by preventing permeation of hydrogen and external moisture into the internal electrodes 121 and 122 by disposing the interfacial layers 121a and 122a including an oxide containing Fe on at least a portion of a region of the internal electrodes 121 and 122 connected to the external electrodes 131 and 132. Meanwhile, the hydrogen mainly refers to hydrogen generated by a chemical reaction during a plating process, but may also include water generated by a plating solution or hydrogen present as water vapor in the air.

However, when all the internal electrodes 121 and 122 included in the body 110 include the interfacial layers 121a and 122a, electrical connectivity between the internal electrodes 121 and 122 and the external electrodes 131 and 132 is may be deteriorated. Therefore, in order to improve the reliability of the multilayer electronic component by preventing permeation of hydrogen and external moisture thereinto, and to secure electrical connectivity between the internal electrodes and the external electrodes, it may be preferable that a portion of the plurality of internal electrodes 121 and 122 include the interfacial layers 121a and 122a, but the other portion of the plurality of internal electrodes 121 and 122 do not include the interfacial layers 121a and 122a.

In an embodiment, the interfacial layers 121a and 122a may include Ni. The Ni may exist in a form of metal in the interfacial layers 121a and 122a, and may also exist in a form of an oxide together with Fe. Ni included in the interfacial layers 121a and 122a may be derived from Ni, which is a main component of the internal electrodes 121 and 122.

Meanwhile, the contents of Fe and Ni included in the interfacial layers 121a and 122a do not need to be particularly limited. However, in an embodiment, when the content of Fe included in the interfacial layers 121a and 122a is C1, and the content of Ni included in the interfacial layers 121a and 122a is C2, a ratio of C1 to C2 (C1/C2) may be 0.7 to 1.3. When the above conditions are satisfied, an effect of preventing permeation of hydrogen and external moisture of the interfacial layers 121a and 122a may be more remarkable. The ratio (C1/C2) may be adjusted by the content of Fe in the glass included in base electrode layers 131a and 132a, to be described later, a sintering temperature of the external electrode, or the like.

The contents of Fe and Ni included in the interfacial layers 121a and 122a may be measured by, for example, imaging a cross-section of the body 110 in the first and second directions, cut in a center of the body 110 in the third direction with a scanning electron microscope (SEM), and then analyzing components by energy dispersive spectroscopy (EDS). In addition, more preferably, the content of Fe and Ni included in the interfacial layers 121a and 122a may refer to a value obtained by analyzing components of a central region in a first direction, an upper region in a first direction, and a lower region in a first direction of the cross-section of the body in the first and second directions, by EDS, respectively, and measuring the content of Fe and Ni of three interfacial layers (a total of nine interfacial layers) respectively disposed in the three regions, and then averaging the same.

In addition, the interfacial layers 121a and 122a may include various elements other than Fe. Elements included in the interfacial layers 121a and 122a may vary depending on components of the glass included in the base electrode layers 131a and 132a. For example, the interfacial layers 121a and 122a may further include at least one of Si, Al, Sn, Zn, Li, Na, Ba, Ca, Sr, Mn, Ag, Ge, In, Co, Ti, P, B, Cu, and K, but the present disclosure is not limited thereto. The elements may exist in a form of oxides together with Fe in the interfacial layers 121a and 122a, but the present disclosure is not limited thereto.

Meanwhile, in order to improve the effect of preventing the hydrogen permeation of the interfacial layers 121a and 122a, it may be preferable that the interfacial layers 121a and 122a further include at least one of Si, Al, Sn, Zn, Mn, Ag, Ge, In, and P, but the present disclosure is not limited thereto.

Meanwhile, a method of forming the interfacial layers 121a and 122a on the internal electrodes 121 and 122 is not particularly limited. Hereinafter, as a preferred example, a method of forming the interfacial layers 121a and 122a will be described. First, a conductive paste for external electrodes including conductive metal and glass may be dipped in the third and fourth surfaces 3 and 4 of the body 110. In this case, the glass may include an Fe oxide such as FeO, $Fe_2O_3$, $Fe_3O_4$, and the like. Thereafter, the conductive paste for external electrodes may be sintered to form base electrode layers 131a and 132a. In this case, in the sintering process, an Fe oxide included in the glass may react with Ni included in the internal electrode, thereby forming interfacial layers 121a and 122a disposed on at least a portion of a region of the internal electrodes connected to the external electrodes. Meanwhile, a sintering temperature is not particularly limited, but sintering may be performed at a temperature of 700° C. or higher. When the sintering temperature is lower than 700° C., sufficient reaction between an Fe oxide and Ni may not occur. Meanwhile, an upper limit of the sintering temperature is not particularly limited, but may be, for example, 860° C. or lower.

Hereinafter, an interfacial layer and a base electrode layer will be described in more detail with reference to FIGS. 3 and 4. Meanwhile, in FIGS. 3 and 4, a first interfacial layer 121a and/or a first base electrode layer 131a is illustrated, but the only difference is that the first interfacial layer 121a may be disposed on the first internal electrode 121 and the second interfacial layer 122a is disposed on the second internal electrode 122, a configuration of the first interfacial layer 121a and the second interfacial layer 122a may be similar, and the first base electrode layer 131a and the second base electrode layer 132a may have a symmetrical relationship with respect to the second direction, so that, hereinafter, description will be made based on the first interfacial layer 121a and the first base electrode layer 131a, but this will be considered to include the description of the second interfacial layer 122a and the second base electrode layer 132a.

A length (a size thereof in a second direction) of the interfacial layer 121a is not particularly limited. However, in an embodiment, an average size of the interfacial layer 121a in the second direction may be 0.01 μm to 0.5 μm. When the average size L1 of the interfacial layer 121a in the second direction is less than 0.01 μm, an effect of preventing hydrogen and external moisture of the present disclosure may be insignificant. In addition, when the average size L1 of the interfacial layer 121a in the second direction exceeds 0.5 μm, electrical connectivity between the internal electrode and the external electrode may deteriorate.

Here, the size of the interfacial layer 121a in the second direction may refer to a maximum size of the interfacial layer 121a in the second direction. In addition, the size of the interfacial layer 121a may be measured by scanning an image of a cross-section of the body 110 in first and second directions cut in a center of the body 110 in the third direction with a scanning electron microscope (SEM) or a scanning transmission electron microscope (STEM). In addition, after measuring a size of at least three interfacial layers 121a observed in the cross-section of the body in the first and second directions, and averaging each measured value, the average size of the interfacial layer 121a in the second direction may be measured.

Meanwhile, a width (a size in a third direction) of the interfacial layer 121a is not particularly limited. However, in order to prevent a deviation in capacitance due to a decrease in connectivity between the internal electrode and the external electrode, it may be preferable that the size W1 of the interfacial layer 121a in the third direction is smaller than a size W2 of the internal electrode in the third direction.

The size W1 of the interfacial layer 121a in the third direction and the size W2 of the internal electrode in the third direction may be measured, from an image observed the cross-section of the body 110, for example, in the first and third directions (e.g., the cross-section illustrated in FIG. 5) with a scanning electron microscope (SEM) or a scanning transmission electron microscope (STEM).

In an embodiment, the interfacial layer 121a may be disposed to be in contact with the glass 32 of the base electrode layer 131a. As described above, the interfacial layer 121a may be formed by reacting an Fe oxide included in the glass 32 with Ni included in the internal electrode, and accordingly, the interfacial layer 121a may be disposed in contact with the glass 32. The interfacial layer 121a disposed in contact with the glass 32 may serve to prevent hydrogen and external moisture from permeating into the body, and the internal electrode disposed in contact with the conductive metal 31 may serve to secure electrical connection with the external electrode.

In an embodiment, a content of Fe included in the interfacial layer 121a and a content of Fe included in the glass 32 may be different from each other. The interfacial layer 121a may be disposed to be in contact with the glass 32, but a composition of the interfacial layer 121a and a composition of the glass 32 are not the same as each other. For example, the interfacial layer 121a may be a reaction phase formed by reacting an Fe oxide included in the glass 32 with Ni included in the internal electrode, and thus the content of Fe included in the interfacial layer 121a and the content of Fe included in the glass 32 may be different from each other.

In an embodiment, the content of Fe included in the interfacial layer 121a may be greater than the content of Fe included in the glass 32. That is, since the Fe oxide included in the glass 32 tends to diffuse toward the internal electrode containing Ni to form a reaction phase, the content of Fe included in the interfacial layer 121a is may be greater than the content of Fe included in the glass 32. As a result, an effect of preventing permeation of hydrogen and moisture of the interfacial layer 121a may be more remarkable.

Meanwhile, a method of measuring the composition of the interfacial layer 121a is not particularly limited, but as described above, a cross-section of the body 110 in the first and second directions cut in a center of the body 110 in the third direction is imaged with a scanning electron microscope (SEM), and then a component is performed using energy dispersive spectroscopy (EDS), so that a composition of the interfacial layer 121a may be measured. However, the present disclosure is not limited thereto, and the composition of the interfacial layer 121a may be measured using various analysis methods such as EMPA and WDS.

Referring to FIG. 4, in an embodiment, in a cross-section of the body 110 in the first and second directions, when a length of an interface between a body and an external electrode is T2, and a length of the interface in which the body and the glass are in contact with each other is T1, $0.2 \leq T1/T2 \leq 0.4$ can be satisfied. When T1/T2 is less than 0.2, a ratio of the internal electrodes including the interfacial layer 121a may be lowered, so that an effect of preventing permeation of hydrogen and external moisture of the present disclosure may be insignificant. In addition, when T1/T2 exceeds 0.4, electrical connectivity between the internal electrode and the external electrode may be deteriorated. The T2 may refer to a size of the interface between the body and the external electrode in a first direction, and the T1 may refer to a size of a region of the interface in which the body and the glass are in contact with each other in a first direction.

Meanwhile, a method of measuring T1 and T2 is not particularly limited, but a measuring method according to a preferred example will be described below. First, a cross-section of the body in first and second directions, cut in a center of the body in a third direction, is imaged, with a scanning electron microscope (SEM). Since a region in which conductive metal 31 is disposed and a region in which glass 32 is disposed may have different colors or shades in the image captured by the scanning electron microscope, a region of the interface between the body and the externa electrode, in which the body and the conductive metal 31 are in contact with each other and a region of the interface thereof, in which body and the glass 32 are in contact with each other may be distinguished among the interfaces between the body and the external electrode. Accordingly, in the image, a total length T2 of the interface between the body and the external electrode and a length T1 of the interface in which the body and the glass are in contact with each other may be measured. Meanwhile, when there are a plurality of regions in which the body and the glass are in contact with each other, T1 may refer to a sum of sizes of the plurality of regions in the first direction.

Example

<Measurement of Hydrogen Permeation Amount in the Body>

First, ceramic green sheets applied with a conductive paste for internal electrodes were stacked, and were cut and sintered to form a body. Next, the third and fourth surfaces of the body were dipped in a conductive paste for external electrodes containing conductive metal and glass, and then sintered at a temperature of 700° C. to 860° C. to form a base electrode layer.

In this case, in the case of the Experimental Example according to an embodiment of the present disclosure, an oxide containing Fe, for example, FeO, $Fe_2O_3$, $Fe_3O_4$ and the like was added to the glass. On the other hand, in the case of the Comparative Example, an oxide containing Fe was not added to the glass. Thus, an Experimental Example in which an interfacial layer containing an oxide containing Fe is disposed and a Comparative Example in which an interfacial layer is not disposed were prepared, and then a hydrogen content evaluation was conducted. In this size, a size of each of the samples in the Experimental Example and the Comparative Example was prepared to have a size of 1005 (length×width, 1.0 mm×0.5 mm), respectively.

A hydrogen content of Experimental Example and Comparative Example was measured using a Standard Test Method for Determination of Hydrogen in Reactive Metals and Reactive Metal Alloys by Inert Gas Fusion with Detection by Thermal Conductivity or Infrared Spectrometry (ASTM E1447). In addition, a content of hydrogen before and after forming a plating layer was measured, respectively, so that an amount of hydrogen, permeating into the body during a plating process was illustrated in Table 1 below.

TABLE 1

| Division | Hydrogen content before plating (ppm) | Hydrogen content after plating (ppm) | Hydrogen permeation amount (ppm) |
|---|---|---|---|
| Experimental Example | 3,457 | 5,699 | 2,242 |
| Comparative Example | 3,197 | 8,261 | 5,064 |

Referring to Table 1, in the case of Experimental Example including an interfacial layer, it can be confirmed that an amount of hydrogen permeation is significantly suppressed as compared to Comparative Example. Accordingly, in the case of a multilayer electronic component according to an embodiment of the present disclosure, it can be confirmed that permeation of hydrogen into the body may be suppressed by including the interfacial layer.

<Moisture Resistance Reliability Evaluation>

Next, moisture resistance reliability of Experimental Examples and Comparative Examples was evaluated. In the Experimental and Comparative Examples, the multilayer electronic component was prepared in the same manner as the above, but after 1200 samples having a size of 1005 (length×width, 1.0 mm×0.5 mm) and 1200 samples having a size of 0603 (length×width, 0.6 mm×0.3 mm), were prepared respectively, moisture resistance reliability evaluation was performed on each sample.

As for moisture resistance reliability evaluation, the prepared sample was mounted on a substrate, a voltage of 1 Vr was applied for 8 hours at a temperature of 85° C. and relative humidity of 85%, and then the number of samples whose insulation resistance fell 1040 or less and were described in Table 2 below.

TABLE 2

| Division | 1005 size Reliability evaluation | 0603 size Reliability evaluation |
| --- | --- | --- |
| Experimental Example | 0/1200 | 0/1200 |
| Comparative Example | 10/1200 | 4/1200 |

Referring to Table 2, in the case of the Comparative Example, it can be confirmed that a defect occurred in the moisture resistance reliability evaluation, and in the case of the Experimental Example, it can be confirmed that no defect occurred in the moisture resistance reliability evaluation. Accordingly, it can be confirmed that the Experimental Example including the interfacial layer had excellent moisture resistance reliability of the multilayer electronic component as compared to the Comparative Example.

As set forth above, as one of various effects of the present disclosure, the reliability of the multilayer electronic component may be improved by preventing hydrogen and external moisture from permeating into the body.

Although the embodiments of the present disclosure have been described in detail above, the present disclosure is not limited by the above-described embodiments and the accompanying drawings, and is intended to be limited by the appended claims. Therefore, various forms of substitution, modification, and change will be possible by those skilled in the art within the scope of the technical spirit of the present disclosure described in the claims, which also falls within the scope of the present disclosure.

In addition, the expression 'one embodiment' used in the present disclosure does not refer to the same embodiment, and is provided to emphasize and describe different unique characteristics. However, one embodiment presented above is not excluded from being implemented in combination with features of another embodiment. For example, even if a matter described in one specific embodiment is not described in another embodiment, it can be understood as a description related to another embodiment, unless there is a description contradicting or contradicting the matter in the other embodiment.

Terms used in this disclosure are only used to describe one embodiment, and are not intended to limit the disclosure. In this case, singular expressions include plural expressions unless the context clearly indicates otherwise.

While example embodiments have been shown and described above, it will be apparent to those skilled in the art that modifications and variations could be made without departing from the scope of the present invention as defined by the appended claims.

What is claimed is:

1. A multilayer electronic component, comprising:
a body including a dielectric layer and internal electrodes alternately disposed with the dielectric layer interposed therebetween in a first direction, the body having first and second surfaces opposing each other in the first direction, third and fourth surfaces connected to the first and second surfaces and opposing each other in a second direction, fifth and sixth surfaces connected to the first to fourth surfaces and opposing each other in a third direction; and
an external electrode disposed on the third and fourth surfaces of the body and comprising a base electrode layer including a conductive metal and glass,
wherein at least one of the internal electrodes includes an interfacial layer disposed on at least a portion of a region connected to the external electrode and being in direct contact with the glass, and
wherein the glass includes a first oxide containing Fe, and the interfacial layer includes a second oxide containing Fe.

2. The multilayer electronic component of claim 1, wherein the interfacial layer comprises Ni, and
a ratio (C1/C2) of C1 to C2 is 0.7 to 1.3, in which C1 is a content of Fe included in the interfacial layer, and C2 is a content of Ni included in the interfacial layer.

3. The multilayer electronic component of claim 1, wherein the interfacial layer further comprises at least one of Si, Al, Sn, Zn, Li, Na, Ba, Ca, Sr, Mn, Ag, Ge, In, Co, Ti, P, B, Cu, and K.

4. The multilayer electronic component of claim 1, wherein an average size of the interfacial layer in the second direction is 0.01 μm to 0.5 μm.

5. The multilayer electronic component of claim 1, wherein the interfacial layer is formed by reaction of the glass of the base electrode layer with Ni included in the internal electrode.

6. The multilayer electronic component of claim 1, wherein $0.2 \leq T1/T2 \leq 0.4$ satisfied, in which T2 is a length of an interface between the body and the external electrode in a cross-section of the body in the first and second directions, and T1 is a length of the interface, in which the body and the glass are in contact with each other, in the cross-section of the body.

7. The multilayer electronic component of claim 1, wherein the first oxide further comprises at least one of Si, Al, Sn, Zn, Li, Na, Ba, Ca, Sr, Mn, Ag, Ge, In, Co, Ti, P, B, Cu, and K.

8. The multilayer electronic component of claim 1, wherein a content of Fe included in the interfacial layer and a content of Fe included in the glass are different from each other.

9. The multilayer electronic component of claim 1, wherein the content of Fe included in the interfacial layer is greater than the content of Fe included in the glass.

10. The multilayer electronic component of claim 1, wherein the conductive metal comprises Cu.

11. The multilayer electronic component of claim 1, wherein the external electrode further comprises a plating layer disposed on the base electrode layer.

12. The multilayer electronic component of claim 1, wherein an average thickness of at least one of the dielectric layers is 0.4 µm or less.

13. The multilayer electronic component of claim 1, wherein an average thickness of at least one of the internal electrodes is 0.4 µm or less.

14. The multilayer electronic component of claim 1,
wherein the internal electrode comprises a first internal electrode and a second internal electrode alternately disposed with the dielectric layer interposed therebetween interposed therebetween, and
the external electrode comprises a first external electrode disposed on the third surface and connected to the first internal electrode and a second external electrode disposed on the fourth surface and connected to the second internal electrode.

\* \* \* \* \*